United States Patent [19]
Spies

[11] Patent Number: 6,018,881
[45] Date of Patent: Feb. 1, 2000

[54] POSITION MEASURING SYSTEM

[75] Inventor: Alfons Spies, Seebruck, Germany

[73] Assignee: Dr. Johannes Heidenhain GmbH, Traunreut, Germany

[21] Appl. No.: 08/990,825

[22] Filed: Dec. 15, 1997

[30] Foreign Application Priority Data

Dec. 17, 1996 [DE] Germany .......................... 196 52 562

[51] Int. Cl.[7] ............................. G01B 7/14; A45B 3/08
[52] U.S. Cl. ......................... 33/706; 33/708; 324/207.24
[58] Field of Search ............................. 33/702, 706, 708, 33/DIG. 1; 324/207.24, 207.11, 207.22

[56] References Cited

U.S. PATENT DOCUMENTS

| | | | |
|---|---|---|---|
| 3,249,854 | 5/1966 | Nevius | ....................................... 73/658 |
| 4,253,021 | 2/1981 | Ernst . | |
| 4,297,033 | 10/1981 | Nelle . | |
| 4,403,859 | 9/1983 | Ernst . | |
| 4,519,709 | 5/1985 | Nelle . | |
| 4,595,991 | 6/1986 | Spies . | |
| 4,602,436 | 7/1986 | Ernst . | |
| 4,606,642 | 8/1986 | Nelle . | |
| 4,612,502 | 9/1986 | Spies . | |
| 4,778,273 | 10/1988 | Michel . | |
| 4,782,229 | 11/1988 | Ernst . | |
| 5,113,066 | 5/1992 | Michel et al. . | |
| 5,120,132 | 6/1992 | Spies et al. . | |
| 5,216,363 | 6/1993 | Masaaki | ............................. 324/207.22 |
| 5,264,915 | 11/1993 | Huber et al. . | |
| 5,332,896 | 7/1994 | Holzapfel . | |
| 5,428,445 | 6/1995 | Holzapfel . | |
| 5,430,374 | 7/1995 | Metz . | |
| 5,545,985 | 8/1996 | Campbell . | |
| 5,576,537 | 11/1996 | Holzapfel et al. . | |
| 5,619,132 | 4/1997 | Spies . | |
| 5,956,659 | 9/1999 | Spies et al. | ............................... 33/706 |

FOREIGN PATENT DOCUMENTS

| | | |
|---|---|---|
| 0 106 951 | 5/1984 | European Pat. Off. . |
| 0 541 829 | 5/1993 | European Pat. Off. . |
| 2 522 807 | 9/1983 | France . |
| 42 08 154 | 9/1992 | Germany . |
| 42 02 680 | 5/1993 | Germany . |
| 44 11 808 | 10/1994 | Germany . |
| 195 08 700 | 8/1996 | Germany . |

OTHER PUBLICATIONS

"Magnetoresistive Sensoren im Kfz" Electronik, by August Peterson, vol. 34, No. 10, May, 1985, pp. 99–102.

"H. Schaumburg: Sensoren," Teubner Stuttgart 1992, pp. 247–268.

"Consideration for a High Resolution of magnetic Rotary Encoder" by Kikuchi et al., IEEE Transaction on Magnetics, vol. 32, No. 5, Sep., 1996, pp. 4959–4961.

*Primary Examiner*—Randy W. Gibson
*Attorney, Agent, or Firm*—Brinks Hofer Gilson & Lione

[57] ABSTRACT

A position measuring system that includes a scale graduation and a scanning element, wherein the scanning element moves relative to the scale graduation along a measurement direction so as to generate position-dependent, intensity-modulated output signals. The scanning element includes a dynamic characteristic, which has saturation areas adjoining both sides of an at least partially approximately linear operating area, in which no significantly changed output signal results any more, even when the input signal changes. The scanning gap (d) between the scale graduation and the scanning element is selected in such a way that as the scanning element moves over its entire measurement range a modulation between maximum input signals, which are located in the saturation areas of the dynamic characteristic, takes place. In order to eliminate the distortions of the output signals which usually occur in this modulation area it is furthermore provided to perform signal filtering in order to remove, in particular, the third harmonic from the output signal.

37 Claims, 7 Drawing Sheets

POSITION MEASURING SYSTEM

Applicant claims, under 35 U.S.C. § 119, the benefit of priority of the filing date of Dec. 17, 1996, of a German patent application, copy attached, Ser. No. 196 52 562.4, filed on the aforementioned date, the entire contents of which are incorporated herein by reference.

BACKGROUND OF THE INVENTION

1. Field of the Invention

The present invention relates to a position measuring system with a scale graduation and with at least one scanning element which can be moved in relation to it, by means of which position-dependent, intensity-modulated output signals can be generated in case of a relative movement, which are fed to a downstream-connected evaluation unit.

2. Discussion of Related Art

The subsequent explanation of the problems whose solution is the basis of the instant invention is provided by means of an example of a magnetic position measuring system. However, in principle similar problems arise in connection with position measuring systems based on other physical scanning principles, for example in connection with optical, inductive or capacitive position measuring systems.

In the case of a magnetic position measuring system, several scanning elements, which are sensitive to magnetic fields, are used for scanning a magnetic scale graduation. Magneto-resistive elements as well as Hall elements, for example, are suitable for this. In the case of an incremental measuring system, a periodic magnetization of a scale graduation, which is movably disposed in relation to the respective elements, is scanned by means of these elements. Here, the periodic magnetization consists, for example, of alternatingly arranged magnetic north and south poles. In the course of the relative movement between the scale graduation and the scanning elements, the outputs of the scanning elements provide periodically modulated signals, which can be further processed in a known manner. In incremental measuring systems, at least one pair of phase-shifted output signals $S_1$, $S_2$ is generated as a rule, wherein the phase shift is 90°. A series of requirements now results in regard to the output signals $S_1$, $S_2$, if they are intended to be further processed in known evaluation units. For example, the evaluation unit as a rule presupposes sinusoidal output signals, since a dependable further division of the signals or their interpolation is only possible on the basis of the ideal sine shape. Furthermore, within a signal period, the two signals $S_1$, $S_2$, phase-shifted by 90°, should have amplitudes which are the same as much as possible. In case of a representation of the signal progression with the aid of a Lissajous figure this means that, if possible, a circle should result as the Lissajous figure. It should be stated that a further demand made on the signal quality is that the maximum amplitudes of the output signals $S_1$, $S_2$ provided should be subject to minimal possible fluctuations, even if, for example, the scanning gap between the magnetic scale graduation and the scanning element used varies.

Problems resulting in respect to the signal quality in connection with known magnetic signal systems will be explained hereinafter by means of FIGS. 1a, 1b, 2a and 2b. FIG. 1a shows the dynamic characteristic of a scanning element which is sensitive to a magnetic field, for example a magneto-resistive element consisting of a center parabolic area and a saturation area which adjoins the parabolic area. In this case, the relative resistance change in comparison to the detected field strength is plotted here, i.e. the field strength to be detected is used as the input signal, and a defined relative resistance change is the result as the output signal. Furthermore, three modulation areas or operating areas a, b and c of the dynamic characteristic of the scanning element have been drawn in the representation, which are to be compared with each other. These modulation areas a, b and c correspond to different maximum magnetic field strengths or respective input signals, between which the scanning element is operated, i.e. the different modulation areas a, b and c represent different scanning gaps between the scanning element and the magnetic scale graduation. The area a with the least maximum field strengths represents the greatest scanning gap, while the area c represents the least scanning gap. In this case, all selected modulation areas are located in the parabolic portion of the dynamic characteristic of the scanning element or respective several scanning elements.

The resultant Lissajous representation is shown in FIG. 1b, which results for two sine- and cosine-shaped signals $S_1$, $S_2$, which are phase shifted by 90°, in the different distance areas a, b and c in the parabolic portion of the dynamic characteristic. Here, for one it can be clearly seen that it is assured in the parabolic area of the dynamic characteristic of the scanning element that circular Lissajous figures result. The signal amplitudes of the two phase-shifted signals $S_1$, $S_2$ are therefore respectively the same. On the other hand, it becomes clear from the representation of FIG. 1b, that the maximum signal amplitudes in the distance areas a and c differ by almost a factor of 2, i.e. the radius of the two circles nearly differs by a factor of 2. However, a fluctuation of the signal amplitudes of this size at varying scanning gaps causes problems during further processing of the signals in the evaluation unit. Accordingly, based on the extreme distance dependency of the field strength of the scanned scale graduation on the scanning gap, a considerable impairment of the signal quality results.

A further problem in connection with known magnetic measuring systems will be explained with the aid of FIGS. 2a and 2b. In this case, the basis is the same dynamic characteristic of a scanning element sensitive to a magnetic field as in the previous example. However, now the scanning element is operated in three modulation areas a, b and c of the dynamic characteristic of the scanning element, all of which are no longer located in the area of the parabolic portion of the dynamic characteristic of the scanning element, but instead already partially in the saturation area of the dynamic characteristic of the scanning element. Therefore, the maximum input signals or respectively maximum field strengths are respectively located in the saturation area of the dynamic characteristic of the scanning element. In this case, the saturation area should be understood to be the area of the dynamic characteristic of the scanning element wherein, even with significant changes in the detected magnetic field strength no changes in the amplitude of the output signals result, or respectively, the plotted relative resistance change remains approximately constant. The area a again represents the largest scanning gap, while the area c represents the smallest scanning gap with the highest detected maximum field strengths.

As can be clearly seen from the associated FIG. 2b with the Lissajous representation of the phase-shifted output signals $S_1$, $S_2$, a circular Lissajous figure still results in the area a with the greatest scanning gap, i.e. equal signal amplitudes of the two phase-shifted output signals result. However, the smaller the scanning gap is selected, i.e. the more the scanning element is modulated in the saturation area, the greater the deviation of the Lissajous figure from the ideal circular shape becomes. This is the case in particular in the area c, where a clear distortion of the formerly circular Lissajous figure can be seen.

Such a dependence of the shape of the Lissajous figure on the scanning gap also causes undesirable errors in the further processing of the signals in the evaluation unit, for example during signal interpolation.

As already implied above, similar problems also arise in connection with position measuring systems based on different physical scanning principles.

SUMMARY OF THE INVENTION

A first aspect of the present invention regards a position measuring system that includes a scale graduation and a scanning element, wherein the scanning element moves relative to the scale graduation along a measurement direction so as to generate position-dependent, intensity-modulated output signals. The scanning element has a dynamic characteristic which has saturation areas adjoining both sides of an at least partially approximately linear operating area, in which no significantly changed output signal results any more, even when the input signal changes. The scanning gap (d) between the scale graduation and the scanning element is selected in such a way that as the scanning element moves over its entire measurement range a modulation between maximum input signals, which are located in the saturation areas of the dynamic characteristic, takes place. The scanning element is laid out in such a way, that at least filtering of the third harmonic from the output signal is assured.

A second aspect of the present invention regards a position measuring system includes a scale graduation and a scanning element, wherein the scanning element moves relative to the scale graduation along a measurement direction so as to generate position-dependent, intensity-modulated output signals. A evaluation unit receives the position dependent, intensity modulated output signals that generates a dynamic characteristic which has respective saturation areas adjoining both sides of an at least partially approximately linear work area, in which no significantly changed output signal results, even when the input signal changes. The scanning gap between the scale graduation and the scanning element is selected in such a way that over the entire measuring area a modulation between maximum input signals, which are located in the saturation areas of the dynamic characteristic takes place. The evaluation unit is laid out in such a way, that at least filtering of the third harmonic from the output signal is assured.

It is therefore an object of each aspect of the present invention to create a position measuring system, which delivers output signals which are distorted as little as possible, even with a relatively large tolerance regarding the scanning gap. Furthermore, constant maximum amplitudes of the output signals are demanded to the greatest extent, even with fluctuating scanning gaps.

An object of the first aspect of the present invention is to modulate a scanning element directly over the entire measuring area in the saturation area of its dynamic characteristic, i.e. between maximum input signals, which are respectively located in the saturation areas of the dynamic characteristic. This can be achieved by a suitable selection of the scanning gap, i.e. if the latter is selected to be sufficiently small, and if it is assured that this scanning gap is maintained over the entire measuring area, the large amplitudes of the detected input signals always cause the modulation of the scanning element up to the saturation area of the dynamic characteristic of the scanning element. By means of this it is assured that no great changes of the maximum amplitude result in case of a possibly varying scanning gap. In order to eliminate the distortions of the output signals which usually occur in this modulation area, it is furthermore provided in accordance with the present invention to perform signal filtering, in order to remove in particular the third harmonic from the output signal of the at least one scanning element. A number of options can be used for filtering undesired harmonics, all of which are known to one skilled in the particular art. Filtering of further harmonic components, for example the fifth, seventh, . . . harmonic, can of course also take place for further signal optimization. Besides measures on the part of the scanning unit or the scanning elements, such filtering can principally also be performed electronically.

The resulting output signals of a position measuring system designed in accordance with the present invention or respectively operated in accordance with the invention have the demanded amplitude constancy with varying scanning gap, as well as a signal progression which is undistorted to a great extent. Further signal processing can be performed in known evaluation units or respectively evaluation units on the basis of the optimized signal quality. The overall result is an improved measurement accuracy.

An object of the second aspect of the present invention is to employ scanning elements with a largely linear output characteristic, and to generate a saturation area of the dynamic characteristic artificially by means of suitable components of the downstream-connected evaluation unit. During measuring operations, modulation is performed up into the saturation area; signal filtering by electronic means is provided.

Therefore the second aspect of the present invention can be employed in connection with the most diverse scanning elements, i.e. in particular also in connection with scanning elements which have a linear output characteristic over a relatively large modulation area.

Further advantages of the invention and details of the position measuring system in accordance with the invention ensue from the subsequent description of exemplary embodiments by means of the attached drawings.

BRIEF DESCRIPTION OF THE DRAWINGS

FIG. 1b shows the Lissajous representations of signals in the three modulation areas of the dynamic characteristic of FIG. 1a;

FIG. 2a shows three further modulation areas of the dynamic characterization of FIG. 1a;

FIG. 2b shows the Lissajous representations of signals in the three modulation areas of FIG. 2a;

DESCRIPTION OF THE PREFERRED EMBODIMENT

Figure 3:
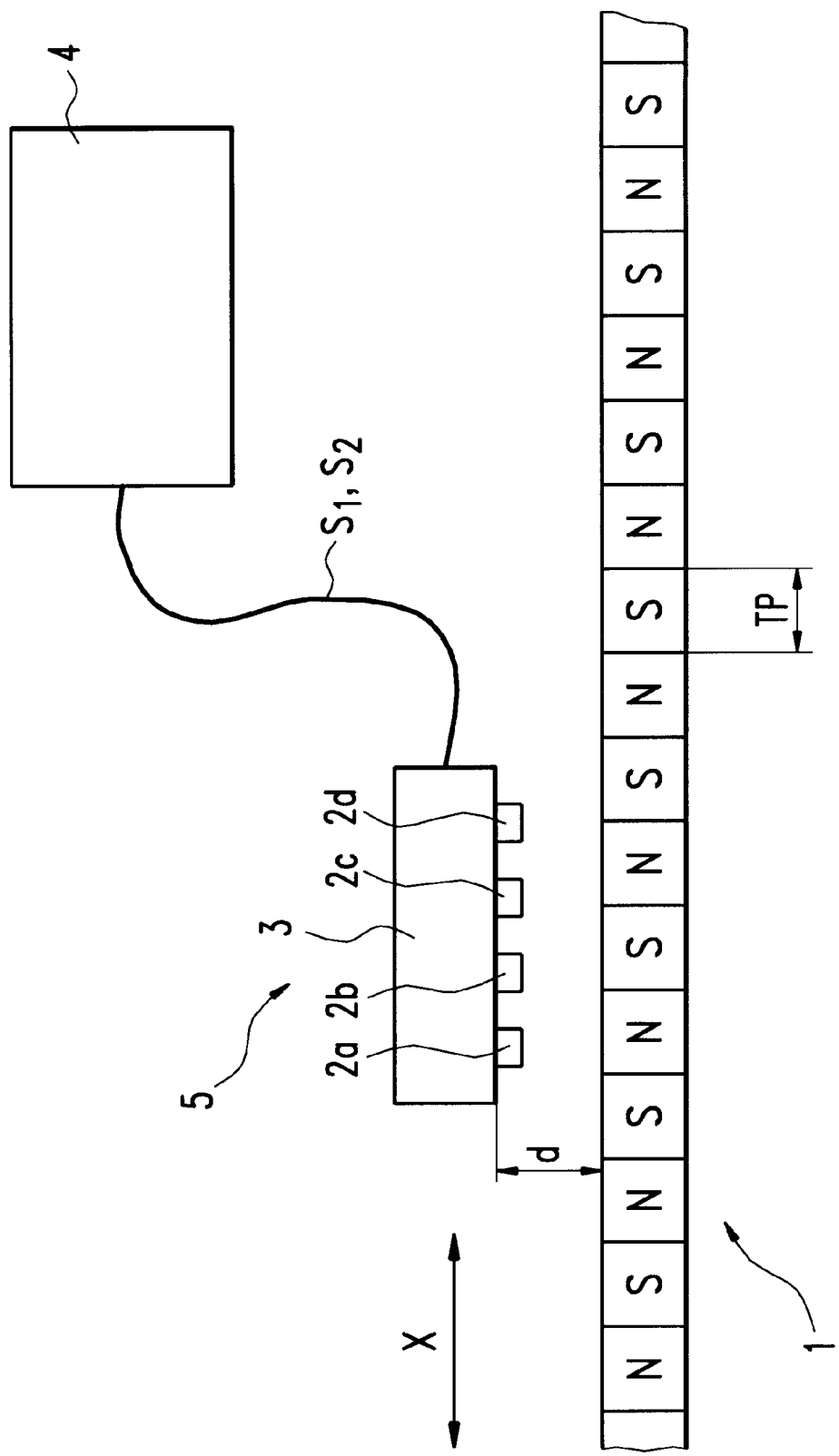
FIG. 3 represents a block wiring diagram of a first embodiment of a magnetic position measuring system in accordance with the present invention.

A schematic block wiring diagram of a first embodiment of the position measuring system in accordance with the invention is represented in FIG. 3. The considerations in accordance with the invention will be explained here in the subsequent drawing figures by means of an example of magnetic position measuring systems. These considerations can also be transferred to other physical scanning principles or respectively position measuring systems in order to assure the desired quality of the output signals in this way.

A magnetic scale graduation 1 in the exemplary embodiment in FIG. 3 is scanned with the aid of several scanning elements 2a to 2d, which are arranged on a suitable support body 3 in a scanning unit 5. It is well known in the art to have a scanning element move along an entire measurement range that spans the length of the graduation 1. During measuring operations, the scanning elements 2a to 2d are at a scanning gap d above the magnetic scale graduation 1. In the exemplary embodiment represented, the scanned magnetic scale graduation 1 is embodied as an alternating sequence of north and south poles, and the magnetic position measuring system operates as an incremental measuring system. In accordance with FIG. 3, the length of a magnetic pole, North (N) or South (S), is defined as the graduation period TP. The scanning unit 5 as well as the magnetic scale graduation 1 are arranged displaceably in respect to each other in the X-direction and are connected, for example, with the workpiece as well as with the tool of a machine tool, whose relative position in respect to each other is intended to be determined with a high degree of accuracy. In the first embodiment represented, several magneto-resistive elements, which are arranged in the shape of strips at equidistant positions perpendicularly in respect to the measuring direction X on the support body 3, are used as scanning elements 2a to 2d. Reference is made to the subsequent description of FIGS. 6 a–c in respect to the definite arrangement of the magneto-resistive elements on the support body 3 in the detector plane. The periodically modulated output signals $S_1$, $S_2$ generated by means of the scanning elements 2a to 2d in the course of a relative displacement between the scale graduation 1 and the scanning unit 5 are further processed in a known manner by an evaluation unit 4 or evaluation unit. In the case of the represented exemplary embodiment, two sine- or respectively cosine-shaped output signals $S_1$, $S_2$, which are phase-shifted by 90°, are generated with the aid of the suitably wired scanning elements 2a to 2d in the course of scanning of the scale graduation 1 embodied as an incremental graduation, so that a directional detection is also possible in addition to the position determination.

To assure the desired signal quality of the output signals $S_1$, $S_2$ transmitted to the evaluating unit 4, a series of measurements is now provided on the part of the position measuring system in accordance with the invention.

In connection with the embodiment represented, scanning elements 2a to 2d are selected, whose dynamic characteristics have a saturation area starting at defined, detected magnetic field strengths, which respectively adjoins an at least approximately linear work area of the scanning element on both sides. In a general form this means that, starting at a defined value of the detected input signal, an output signal of the scanning element results in a saturation area in which, even in case of a change of the input signal, no significantly changed output signal results.

Figure 4A:
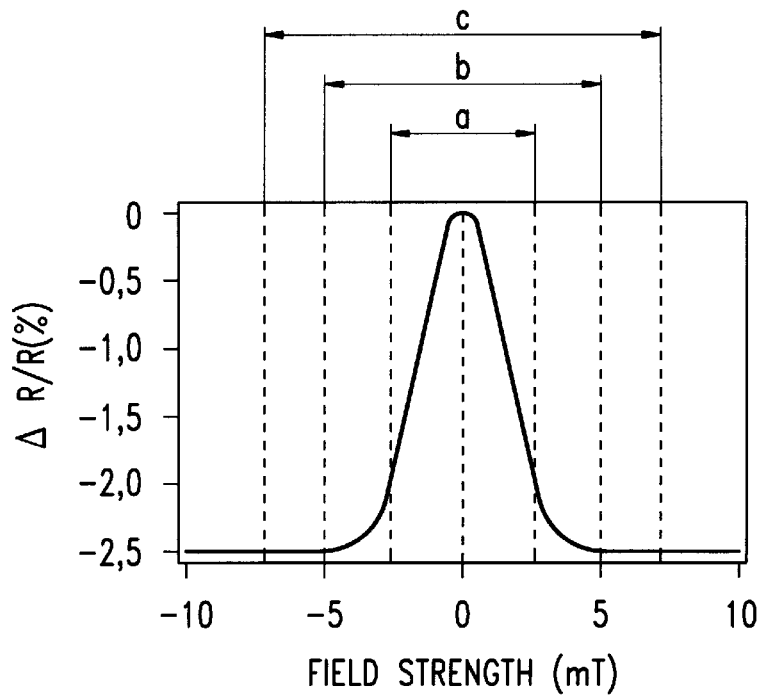
FIG. 4a represents the dynamic characteristic of a first embodiment of a scanning element which can be employed with the position measuring system in accordance with the present invention.

The dynamic characteristic of a suitably designed scanning element which is sensitive to a magnetic field is represented in FIG. 4a, which in this case is a so-called parabolic dynamic characteristic. In this embodiment, by the term saturation area of the dynamic characteristic an area is understood in which no significant change of the amplitude of the output signals results in spite of a variation in the input signals caused by the detected magnetic field strengths. Such a saturation area exists approximately starting at a value of ±5 mT of the magnetic field strengths in the example of FIG. 4a.

Scanning elements 2a to 2d embodied in this way are now operated in accordance with the invention in such a way, that a modulation up to the saturation area of the dynamic characteristic takes place over the entire measuring area, i.e. over the entire length of the scanned magnetic scale graduation 1. Accordingly, a modulation of the scanning element between maximum input signals, which are respectively located in the saturation areas of the dynamic characteristic, takes place. This can be achieved in that the scanning gap d between the scanning elements 2a to 2d and the magnetic scale graduation 1 is selected to be so small, that the scanning elements 2a are always modulated between maximum field strengths or respectively input signals, which are located in the saturation area, i.e. which are greater than approximately ±5 mT. A required scanning gap d of such a small length can be easily provided by suitable structural measures in the position measuring system in accordance with the invention in that it is provided, for example, to let the scanning unit slide over the scale graduation.

Figure 4B:
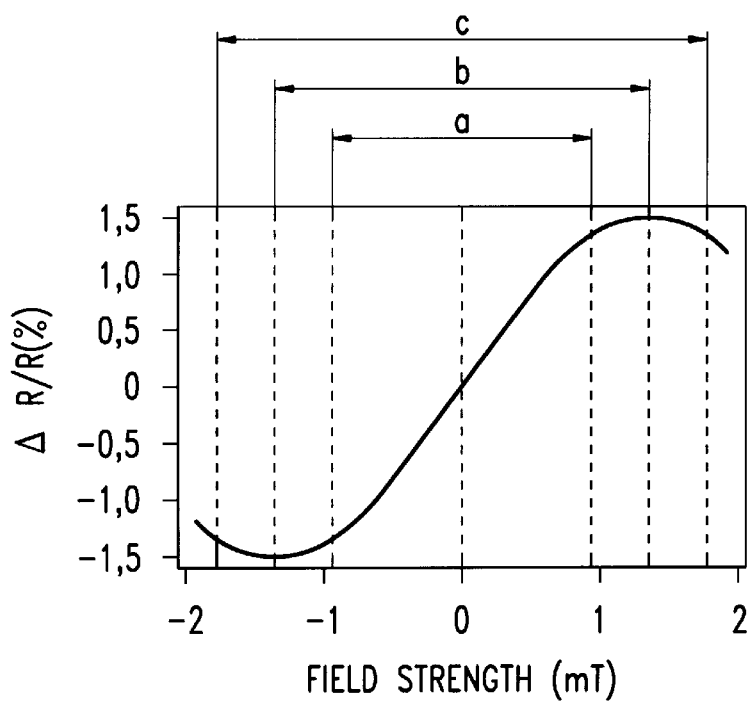
FIG. 4b represents the dynamic characteristic of a second embodiment of a scanning element which can be employed with the position measuring system in accordance with the present invention.

The dynamic characteristic of a further suitable scanning element, which can also be employed in the position measuring system in accordance with the invention, is represented in FIG. 4b. In the case of higher detected magnetic field strengths, this dynamic characteristic also displays a saturation area in which no significant changes in the amplitude of the output signals result any more in case of a change of the magnetic field strength acting on them. Here, too, a saturation area of the dynamic characteristic adjoins an at least partial linear operating range. Magneto-resistive elements, with which certain measures are being taken to linearize the output characteristics, have such dynamic characteristics. This can be achieved, for example, in a known manner by means of a biased magnetic field, which is generated by a permanent magnet in the vicinity of the magneto-resistive elements, for example. In respect to the dynamic characteristic it is important that in the range of higher magnetic field strengths of the input signals no large changes in the amplitudes of the output signals result, or respectively that they do not change even with a variation of the magnetic field strengths.

Besides the modulation of the scanning elements used as far as the area of the saturation of the respective dynamic characteristic, it is furthermore provided to perform filtering of the output signals $S_1$, $S_2$.

In this case, filtering is provided in such a way that at least the third harmonic is eliminated from the output signals $S_1$, $S_2$. By means of such filtering, the undesired signal distortions already mentioned in the preamble of the specification in connection with narrow scanning gaps d can be avoided to a large extent or respectively minimized.

Regarding suitable filtering methods in the position measuring system in accordance with the invention, reference is made in this connection, for example, to European Patent Publication EP 0 541 829 of Applicant. A number of options are proposed there as to how filtering of the output signals $S_1$, $S_2$ can be achieved in the case of magneto-resistive scanning elements, and at least the third harmonic can be eliminated from the output signals. Possible filtering variants of this provide, for example the oblique arrangement of the strip-shaped magneto-resistive elements in respect to the measuring direction, or a variation of the length of such elements in accordance with a sine- or cosine function. Suitable filter arrangements for filtering the third harmonic and, partially also of the fifth harmonic, from output signals will be described below by means of FIGS. 6a to 6c.

Figure 1A:
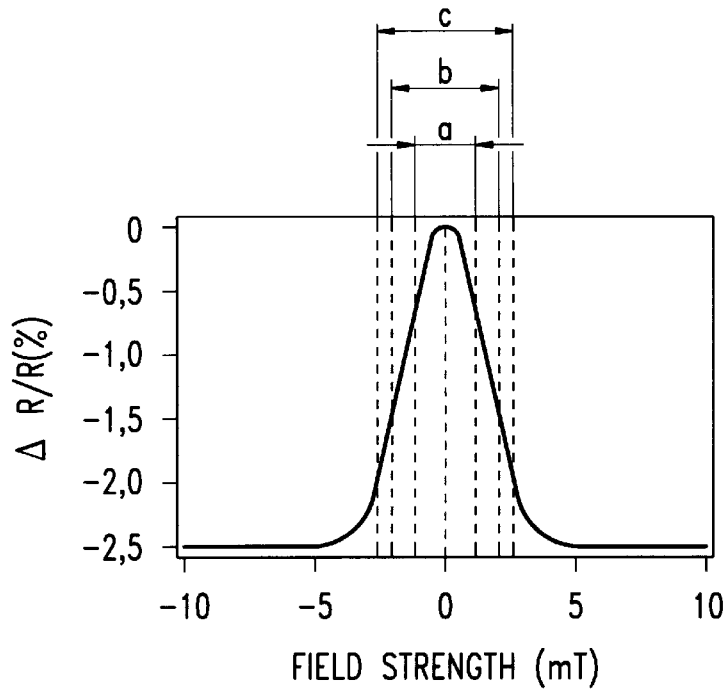
FIG. 1a shows three modulation areas of the dynamic characteristic of a known scanner element.
Figure 1B:
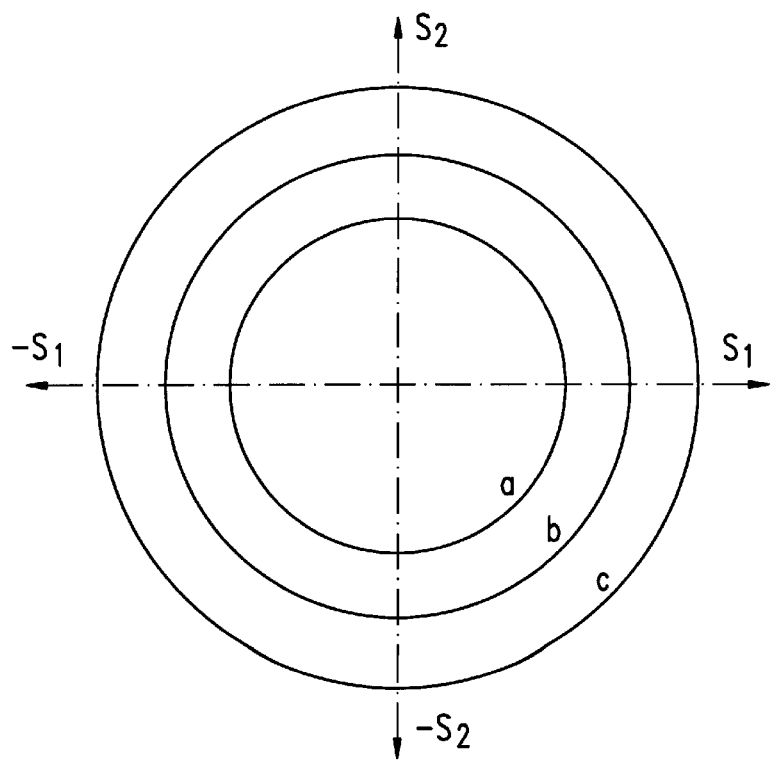
Figure 2A:
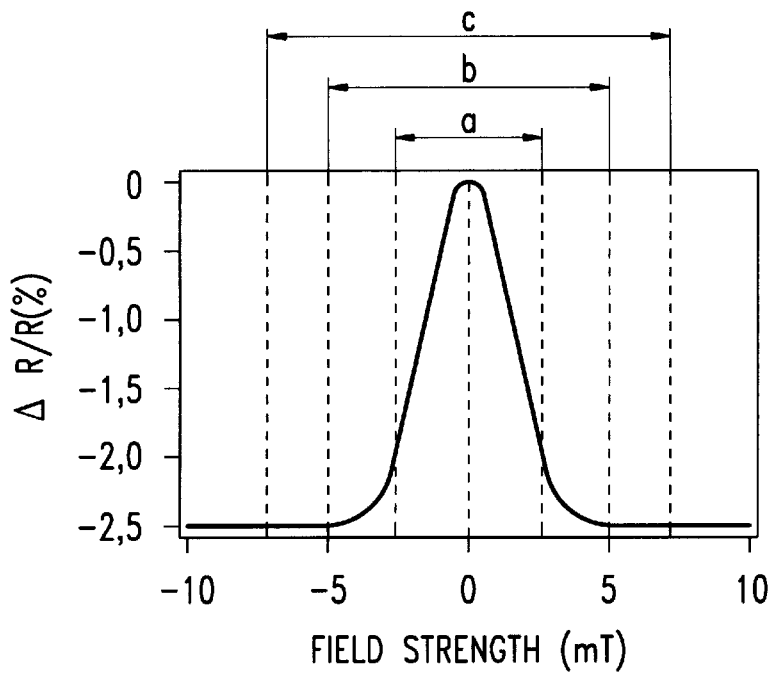
Figure 2B:
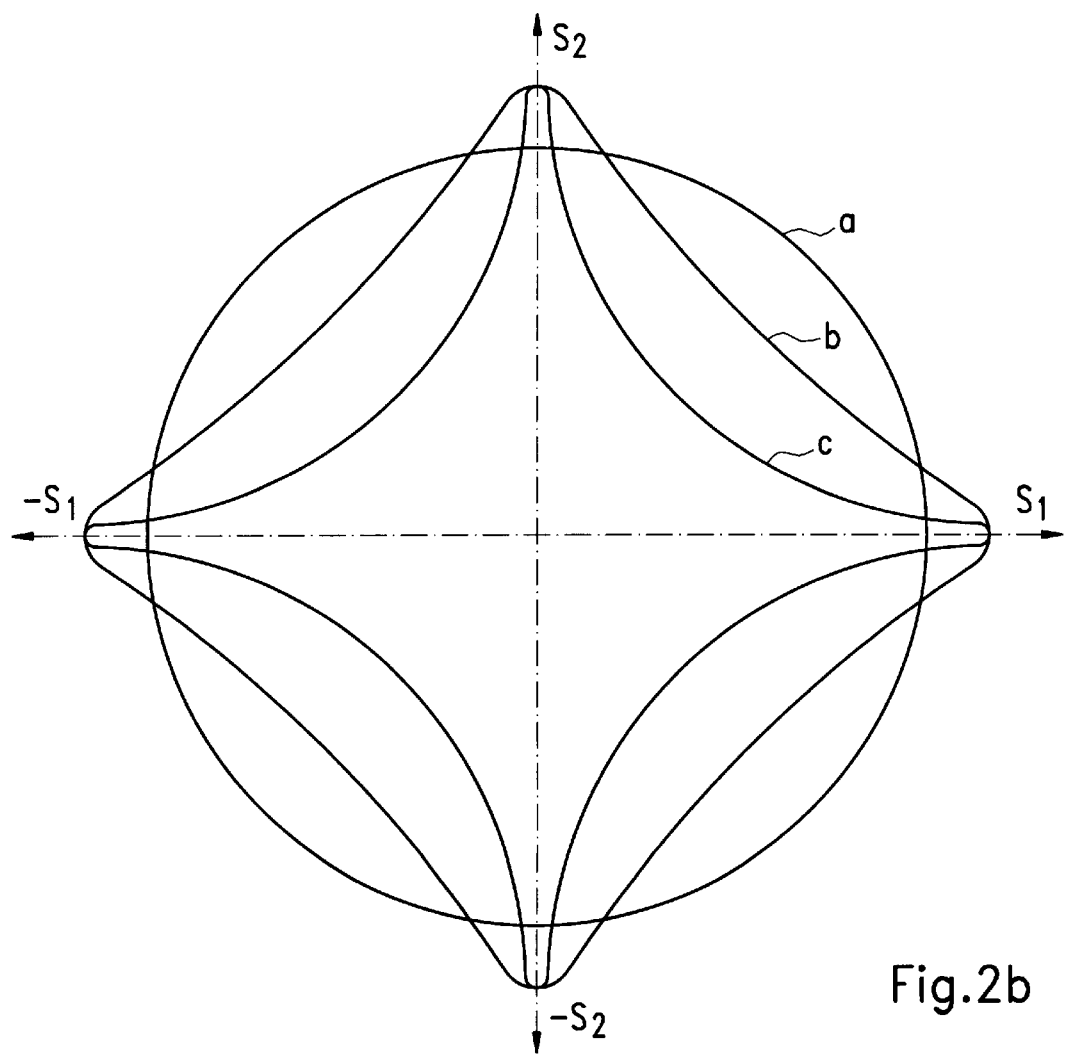
Figure 5:
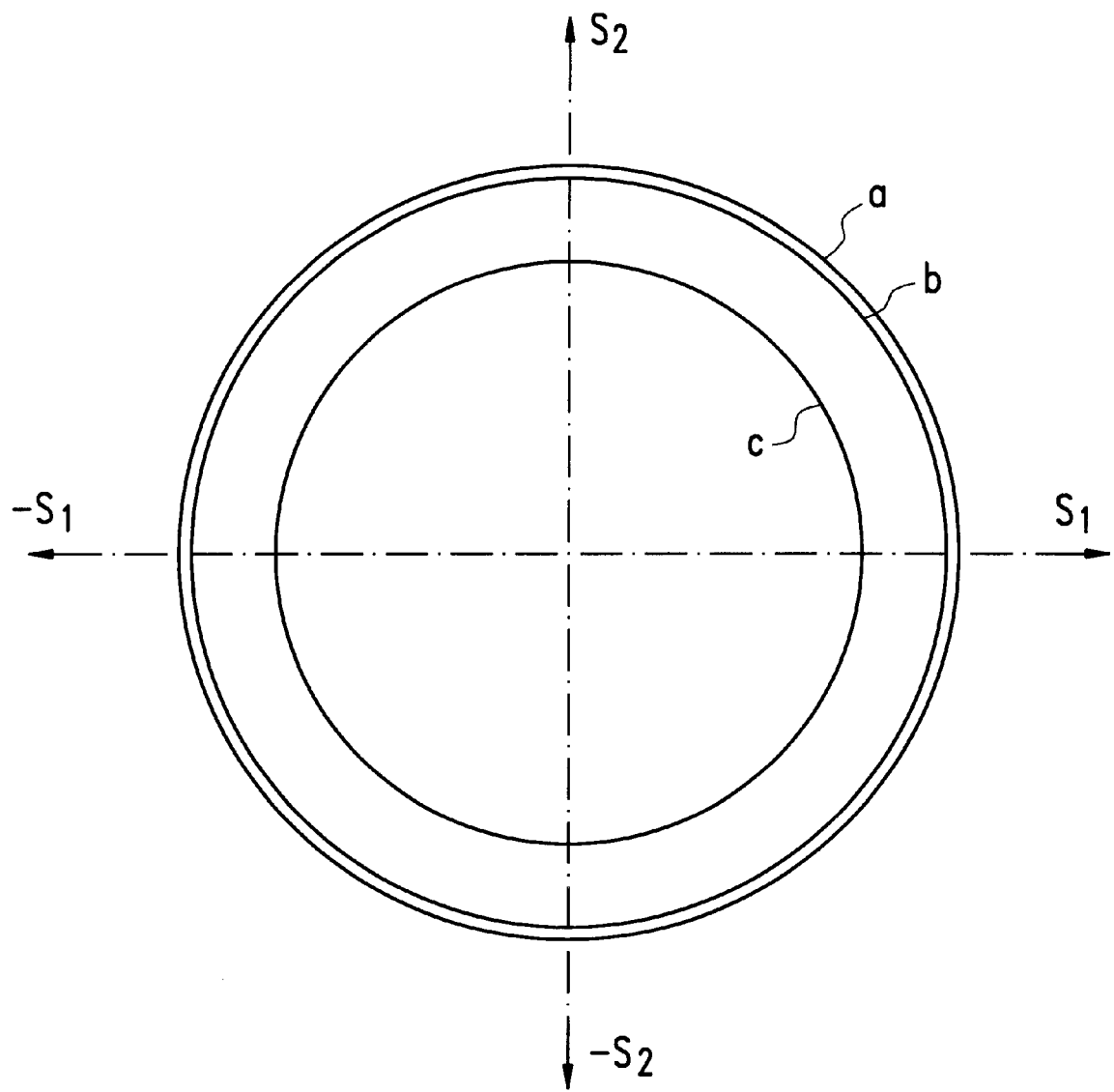
FIG. 5 represents the resulting Lissajous representation in the position measuring system in accordance with the present invention.

The desired improved signal quality of the output signals $S_1$, $S_2$ results on the basis of the explained measures in the position measuring system in accordance with the invention. In connection with this, in FIG. 5 the signal progression of two output signals $S_1$, $S_2$, which are phase-shifted by 90°, is shown in the known Lissajous representation, which results on the basis of the described embodiment of the position measuring system in accordance with the invention in the various scanning areas a to c in FIGS. 4a and 4b. It can now be clearly discerned for one, that in spite of the modulation in the range of high magnetic field strengths, i.e. in particular in the area c, no signal distortion occurs at all, such as could be observed, for example, in the case of FIG. 2b. It can furthermore be seen that at the distances a and c the maximum amplitudes of the signals merely differ by a relatively small amount, i.e. the required extensive independence of the amplitudes of the output signals $S_1$, $S_2$ from the scanning gap d is assured.

Therefore sufficiently optimized output signals $S_1$, $S_2$ result in the position measuring system in accordance with the invention, which produce clearly fewer errors during their further processing in the evaluation unit or evaluation device 4 for position determination.

Figure 6A:
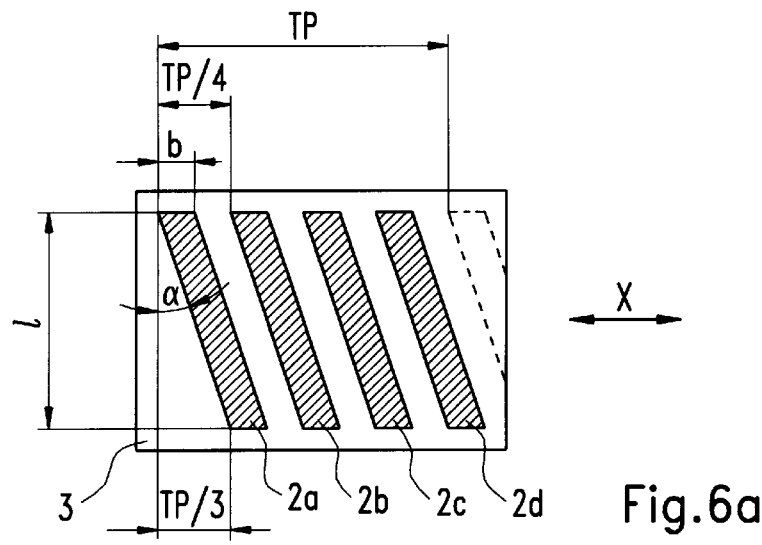
FIGS. 6a to c show a plan view of several embodiments of scanning elements in the detector plane which is suitable for filtering defined harmonics with a scanning unit of a magnetic position measuring system.
Figure 6B:
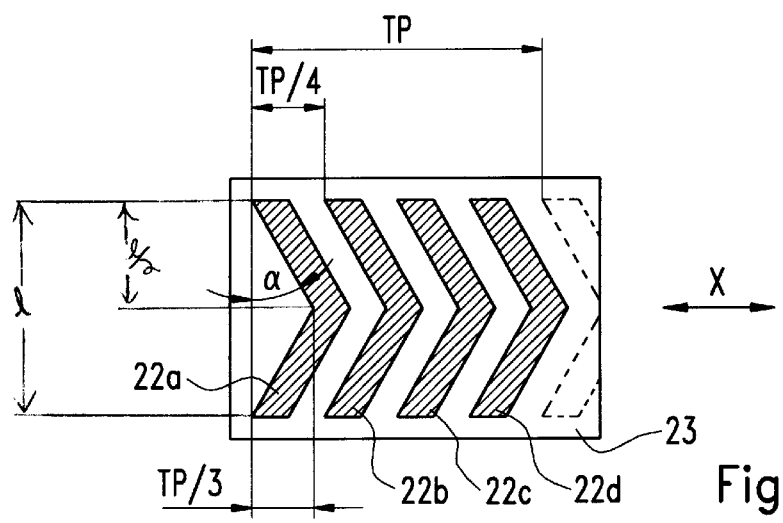
Figure 6C:
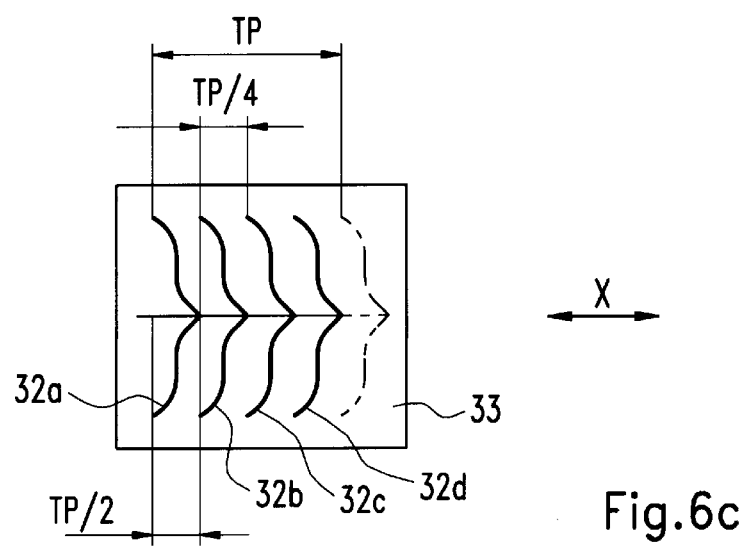

A view of the detector plane of the employed scanning unit 5 from the exemplary embodiment of FIG. 3 is represented in FIG. 6a. Further options for arranging the scanning elements, which simultaneously assure the desired filtering effect, are represented in FIGS. 6b and 6c. In this case, FIGS. 6a to 6c do not represent the arrangement in the detector plane to scale, among others also not the angular conditions explained below.

In the variant in accordance with FIG. 6a, a total of four scanning elements 2a to 2d in the form of magneto-resistive elements are disposed in the detector plane on the support body 3. In this case the four scanning elements 2a to 2d extend over a graduation period TP of the scale graduation. Here, an oblique arrangement in the detector plane of the four scanning elements 2a to 2d in relation to the measuring direction X at a defined angle α in respect to a direction perpendicular to the measurement direction is provided, by means of which the desired filtering of the third harmonic is caused. The respective angle α results from the equation tan α=TP/3l, wherein the length l represents the length of the scanning elements 2a to 2d, and TP describes the graduation period of the scale graduation explained above. In the case of a graduation period TP of the magnetic scale graduation and a non-linearized dynamic characteristic in accordance with FIG. 6a, the four strips 2a to 2d are arranged at equal distances within a graduation period TP of the magnetic scale graduation. The distance between left edges of adjoining scanning elements in this case is respectively TP/4 in accordance with FIG. 6a. The graduation period TP is defined in accordance with FIG. 3. Besides the angular orientation of the scanning elements 2a to 2d, which causes the desired filtering of the third harmonic, a filter effect can further be achieved in that the width b of the trapezoidal scanning elements 2a to 2d is suitably selected. Thus, under the given conditions with a width b=TP/5, filtering of the fifth harmonic out of the output signals $S_1$, $S_2$ also results, which are generated in a known manner by appropriate wiring of the four scanning elements 2a to 2d. It is of course also possible or respectively advantageous, if several groups of four scanning elements 2a to 2d designed in this way are arranged next to each other in a scanning unit and wired together.

A further option of designing the scanning unit which assures the desired filter effect is shown in FIG. 6b. Here, again, four scanning elements 22a to 22d, which are embodied as strip-shaped magneto-resistive elements, are arranged on a support body 23 within a graduation period TP. But now the magneto-resistive strips are arranged in a V-shape oriented symmetrically with respect to a central axis oriented parallel to the measuring direction X. The distance between left edges of adjoining scanning elements again is TP/4. Again, the width b of the scanning elements 22a to 22d designed in a V-shape has been selected as TP/5 in such a way that, besides the filtering of the third harmonic provided by the oblique arrangement, filtering of the fifth harmonic also occurs as a result of the choice of the width b. The angle α, which describes the arrangement of the magneto-resistive strips with respect to the vertical line in relation to the measuring direction, in this embodiment is the result of the equation tan α=TP/(3l/2).

A third option for designing the scanning unit or arranging the magneto-resistive elements 32a to 32d is represented in FIG. 6c. The magneto-resistive strips 32a to 32d arranged on a support body 33 are embodied symmetrically in respect to a central axis, which is oriented parallel with respect to the measuring direction X. The lengths of the magneto-resistive strips 32a to 32d extends in a direction perpendicular to the direction X. The shape of the strips 32a to 32d has been selected to be sinusoidal. Again, four scanning elements 32a to 32d are arranged inside a graduation period TP, whose left edges respectively have a distance TP/4 from each other.

Besides the variants for filtering at least the third harmonic explained in FIGS. 6a to 6c, there are further known options which can also be employed in the position measuring system in accordance with the invention.

Figure 7A:
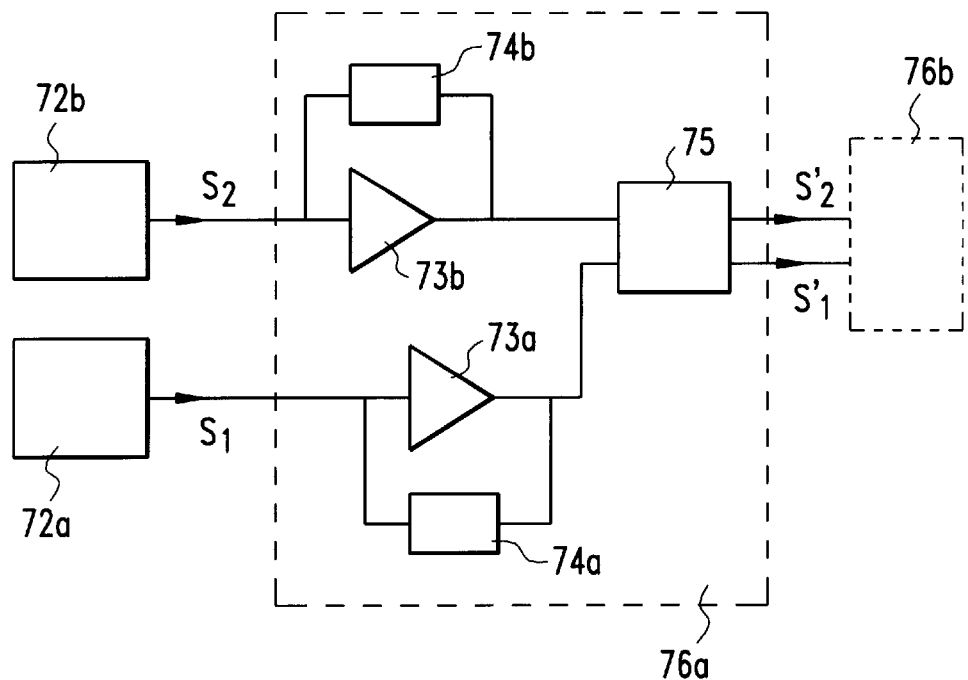
FIG. 7a schematically represents a portion of a further embodiment of the position measuring system in accordance with the present invention.
Figure 7B:
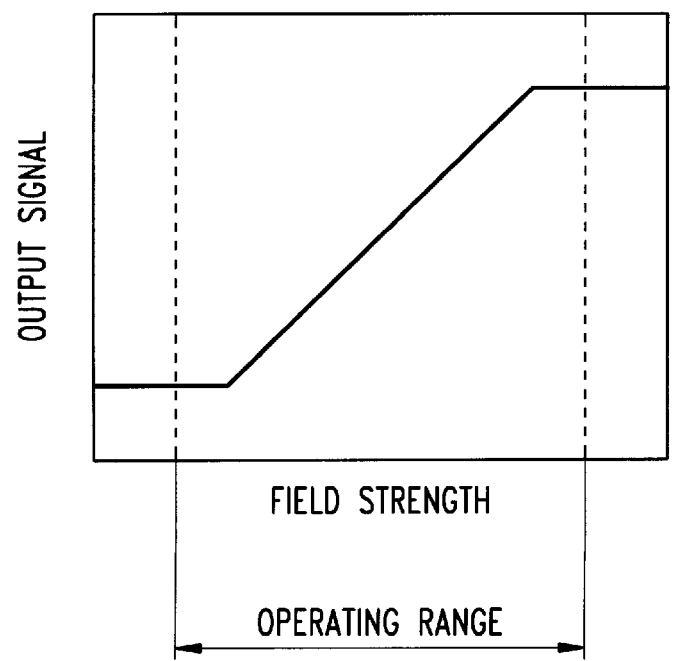
FIG. 7b represents the dynamic characteristic of the arrangement in FIG. 7a. according to the present invention.

A further second embodiment of the position measuring system in accordance with the invention, which again is designed as a magnetic position measuring system, is partially represented in FIG. 7a in a schematic block wiring diagram. The scanned magnetic scale graduation is not shown here. In contrast to the first exemplary embodiment it is now provided to use scanning elements 72a, 72b, which are sensitive to a magnetic field, with a mainly linear dynamic characteristic, for example Hall elements. Therefore, the dynamic characteristic of these elements 72a, 72b has a saturation area at magnetic field strengths which, as a rule, cannot be attained in the case of a scanned scale graduation. Therefore, the scanning elements 72a, 72b cannot be operated or respectively modulated in the saturation area, such as had been provided by the invention in the previous exemplary embodiment. In order to convert the explained principles of the invention, it is provided in this embodiment of a magnetic position measuring system to artificially generate a saturation area of the dynamic characteristic by means of components 74a, 74b in the input element 76a of the evaluation unit 76a, 76b, which is disposed downstream of the scanning elements 72a, 72b. For this purpose, in the embodiment represented, respectively non-linear elements 74a, 74b are connected parallel with the amplifiers 73a, 73b in the input element 76a of the evaluation unit. These non-linear elements 74a, 74b can perhaps be suitable resistors, diodes, etc., which cause a non-linear dynamic characteristic of the amplifier. The trapezoidal dynamic characteristic of the amplifiers 73a, 73b modified in this way is represented in FIG. 7b.

The modulation of a dynamic characteristic of an amplifier modified in this way is again performed between the artificially created saturation areas, i.e. the scanning gap must again be selected to be so narrow, that such a work area is maintained over the entire measuring length. Since with an embodiment of this type no filtering of the harmonic components is possible on the sides of the scanning elements 72a, 72b with a linear output characteristic, required filtering of at least the third harmonic takes place electronically downstream of the amplifiers 73a, 73b via a schematically indicated filter unit 75. Following signal processing of this type, the optimized signals $S_1'$, $S_2'$ are present at the output side, which can be used by the downstream connected element 76b of the evaluation unit in a known manner for the position determination.

Regarding filtering of the signals in this embodiment of the position measuring system in accordance with the invention, further reference is made to European Patent Publication EP 0 106 951 B1 of Applicant. A method is explained there, for example by means of the embodiment of FIG. 7, how undesired harmonic portions can be eliminated in an electronic way from a periodic scanning signal.

It is therefore also possible in accordance with the invention to employ scanning elements with a largely linear output characteristic without saturation areas, for example Hall elements, while still obtaining the desired signal quality. The results are therefore a number of possibilities of designing the position measuring system in accordance with the invention in a suitable manner.

The invention may be embodied in other forms than those specifically disclosed herein without departing from its spirit or essential characteristics. For example, it is possible for the magnetic position measuring system to be embodied both as a linear measuring system and as rotary measuring system. Besides this, embodiment options with several adjoining graduation tracks of different graduation periods, etc. also result. Therefore diverse embodiment options exist within the scope of the considerations in accordance with the invention, in particular, the considerations in accordance with the invention can be employed in connection with different physical scanning principles. The described embodiments are to be considered in all respects only as illustrative and not restrictive, and the scope of the invention is commensurate with the appended claims rather than the foregoing description.

I claim:

1. A position measuring system comprising:

a scale graduation;

a scanning element, wherein said scanning element moves relative to said scale graduation along a measurement direction so as to generate position-dependent, intensity-modulated output signals;

said scanning element comprises a dynamic characteristic, which has saturation areas adjoining both sides of an at least partially approximately linear operating area, in which no significantly changed output signal results any more, even when the input signal changes;

the scanning gap (d) between said scale graduation and said scanning element is selected in such a way that said scanning element is operated in its saturation areas of the dynamic characteristic; and wherein said scanning element is laid out in such a way, that at least filtering of the third harmonic from said output signal is assured.

2. The position measuring system of claim 1, comprising a evaluation unit that receives said output signals.

3. The position measuring system of claim 1, wherein said scanning element comprises a magneto-resistive element.

4. The position measuring system of claim 1, wherein said scale graduation comprises a magnetic scale graduation.

5. The position measuring system of claim 3, wherein said scale graduation comprises a magnetic scale graduation.

6. The position measuring system of claim 3, wherein said magneto-resistive element in the area of the scanned magnetic field strengths of said scale graduation comprises an essentially parabolic dynamic characteristic.

7. The position measuring system of claim 3, wherein said magneto-resistive element in the area of the scanned magnetic field strengths of said scale graduation comprises an essentially linearized dynamic characteristic.

8. The position measuring system of claim 1, wherein said scanning element comprises a plurality of strip-shaped magneto-resistive elements.

9. The position measuring system of claim 8, wherein said plurality of strip-shaped magneto resistive elements are arranged equidistantly from one another.

10. The position measuring system of claim 8, wherein said plurality of strip-shaped magneto-resistive elements are arranged at an acute angle ($\alpha$) with respect to a direction perpendicular to said measuring direction.

11. The position measuring system of claim 10, wherein arranging said plurality of strip shaped magneto resistive elements at said acute angle ($\alpha$) results in at least filtering of the third harmonic in said output signals.

12. The position measuring system of claim 8, wherein said plurality of strip magneto-resistive elements have a width as measured in said measuring direction such that at least filtering of the fifth harmonic in said output signals results.

13. The position measuring system of claim 10, wherein said plurality of strip magneto-resistive elements have a width as measured in said measuring direction such that at least filtering of the fifth harmonic in said output signals results.

14. The position measuring system of claim 12 wherein said width has a value equal to TP/5 wherein TP is the graduation period of said magnetic scale graduation.

15. The position measuring system of claim 8, wherein the length of said plurality of strip magneto-resistive elements in a direction perpendicular to said measuring direction is selected depending on a sine- or cosine function.

16. The position measuring system of claim 10, wherein the length of said plurality of strip magneto-resistive elements in a direction perpendicular to said measuring direction is selected depending on a sine- or cosine function.

17. The position measuring system of claim 10, wherein said acute angle ($\alpha$) has a value defined by the equation tan $\alpha$=TP/3l, wherein TP is the graduation period of said magnetic scale graduation and l is the length of said plurality of strip magneto-resistive elements in a direction perpendicular to said measuring direction.

18. The position measuring system of claim 8, wherein said plurality of strip-shaped magneto-resistive elements are V-shaped.

19. The position measuring system of claim 18, wherein said V-shaped strip-shaped magneto-resistive strips are arranged symmetrically with respect to a central axis, which is oriented parallel to said measuring direction.

20. The position measuring system of claim 18, wherein each of said V-shaped strip-shaped magneto-resistive elements have an edge that is arranged at an acute angle ($\alpha$) with respect to a direction perpendicular to said measuring direction.

21. The position measuring system of claim 20, wherein said acute angle ($\alpha$) has a value defined by the equation tan $\alpha$=TP/(3l/2), wherein TP is the graduation period of said magnetic scale graduation and l is the length of said plurality of strip magneto-resistive elements in a direction perpendicular to said measuring direction.

22. The position measuring system of claim 20, wherein arranging said plurality of strip shaped magneto resistive elements at said acute angle ($\alpha$) results in at least filtering of the third harmonic in said output signals.

23. The position measuring system of claim 18, wherein said plurality of strip magneto-resistive elements have a width as measured in said measuring direction such that at least filtering of the fifth harmonic in said output signals results.

24. The position measuring system of claim 23 wherein said width has a value equal to TP/5 wherein TP is the graduation period of said magnetic scale graduation.

25. The position measuring system of claim 8, wherein said plurality of strip-shaped magneto-resistive elements are sine-shaped.

26. The position measuring system of claim 9, wherein said plurality of strip-shaped magneto-resistive elements are sine-shaped.

27. The position measuring system of claim 25, wherein said sine-shaped strip-shaped magneto-resistive strips are arranged symmetrically with respect to a central axis, which is oriented parallel to said measuring direction.

28. A position measuring system comprising:
a scale graduation;
a scanning element, wherein said scanning element moves relative to said scale graduation along a measurement direction so as to generate position-dependent, intensity-modulated output signals;
an evaluation unit that receives said position-dependent, intensity modulated output signals that generates a dynamic characteristic which has respective saturation areas adjoining both sides of an at least partially approximately linear work area, in which no significantly changed output signal results, even when the input signal changes;
the scanning distance between said scale graduation and said scanning element is selected in such a way that is located in its saturation areas of the dynamic characteristic; and
wherein said evaluation unit is laid out in such a way, that at least filtering of the third harmonic from said output signal is assured.

29. The position measuring system of claim 28, wherein said scanning element comprises a Hall element.

30. The position measuring system of claim 29, wherein said Hall element has a largely linear dynamic characteristic.

31. The position measuring system of claim 28, wherein said evaluation unit comprises a component, having a non-linear characteristic, connected in parallel with an amplifier so that a dynamic characteristic with saturation areas of the amplifier results.

32. The position measuring system of claim 31, wherein said amplifier has a trapezoidal dynamic characteristic.

33. The position measuring system of claim 31, wherein said evaluation unit is laid out in such a way, that at least filtering of the third harmonic from said output signal is assured.

34. A position measuring system comprising:
a scale graduation;
a scanning element, wherein said scanning element comprises a plurality of V-shaped strip-shaped magneto-resistive elements and said scanning element moves relative to said scale graduation along a measurement direction so as to generate position-dependent, intensity-modulated output signals;
said scanning element comprises a dynamic characteristic, which has saturation areas adjoining both sides of an at least partially approximately linear operating area, in which no significantly changed output signal results any more, even when the input signal changes;
the scanning distance (d) between said scale graduation and said scanning element is selected in such a way that as said scanning element moves over its entire measurement range a modulation between maximum input signals, which are located in the saturation areas of the dynamic characteristic, takes place; and
wherein said scanning element is laid out in such a way, that at least filtering of the third harmonic from said output signal is assured.

35. A position measuring system comprising:
a scale graduation;
a scanning element, wherein said scanning element comprises a plurality of sine-shaped strip-shaped magneto-resistive elements and said scanning element moves relative to said scale graduation along a measurement direction so as to generate position-dependent, intensity-modulated output signals;
said scanning element comprises a dynamic characteristic, which has saturation areas adjoining both sides of an at least partially approximately linear operating area, in which no significantly changed output signal results any more, even when the input signal changes;
the scanning distance (d) between said scale graduation and said scanning element is selected in such a way that as said scanning element moves over its entire measurement range a modulation between maximum input signals, which are located in the saturation areas of the dynamic characteristic, takes place; and
wherein said scanning element is laid out in such a way, that at least filtering of the third harmonic from said output signal is assured.

36. A position measuring system comprising:
a scale graduation;
a scanning element, wherein said scanning element moves relative to said scale graduation along a measurement direction so as to generate position-dependent, intensity-modulated output signals;
said scanning element comprises a dynamic characteristic, which has saturation areas adjoining both sides of an at least partially approximately linear operating area, in which no significantly changed output signal results any more, even when the input signal changes;

the scanning gap (d) between said scale graduation and said scanning element is selected in such a way that as said scanning element is operated in its entire measurement range a maximum output signal does not occur when compared with other possible scanning gaps when the scanning element is operated in said at least partially approximately linear operating area; and wherein said scanning element is laid out in such a way, that at least filtering of the third harmonic from said output signal is assured.

37. A position measuring system comprising:

a scale graduation;

a scanning element, wherein said scanning element moves relative to said scale graduation along a measurement direction so as to generate position-dependent, intensity-modulated output signals;

an evaluation unit that receives said position-dependent, intensity modulated output signals that generates a dynamic characteristic which has respective saturation areas adjoining both sides of an at least partially approximately linear work area, in which no significantly changed output signal results, even when the input signal changes;

the scanning distance between said scale graduation and said scanning element is selected in such a way that as said scanning element is operated in its entire measurement range a maximum output signal does not occur when compared with other possible scanning gaps when said scanning element is operated in said at least partially approximately linear working area; and wherein said evaluation unit is laid out in such a way, that at least filtering of the third harmonic from said output signal is assured.

* * * * *